(12) United States Patent
Amin-Sanayei

(10) Patent No.: US 8,785,580 B2
(45) Date of Patent: Jul. 22, 2014

(54) ULTRA-HIGH MOLECULAR WEIGHT POLY(VINYLIDENE FLUORIDE)

(75) Inventor: Ramin Amin-Sanayei, Collegeville, PA (US)

(73) Assignee: Arkema Inc., King of Prussia, PA (US)

( * ) Notice: Subject to any disclaimer, the term of this patent is extended or adjusted under 35 U.S.C. 154(b) by 401 days.

(21) Appl. No.: 12/307,630

(22) PCT Filed: Jun. 26, 2007

(86) PCT No.: PCT/US2007/072085
§ 371 (c)(1),
(2), (4) Date: Jan. 6, 2009

(87) PCT Pub. No.: WO2008/005745
PCT Pub. Date: Jan. 10, 2008

(65) Prior Publication Data
US 2009/0203864 A1      Aug. 13, 2009

Related U.S. Application Data

(60) Provisional application No. 60/818,869, filed on Jul. 6, 2006.

(51) Int. Cl.
*C08F 14/22* (2006.01)

(52) U.S. Cl.
USPC ........... 526/255; 526/207; 526/216; 526/247; 526/249; 526/250; 526/253; 526/254

(58) Field of Classification Search
USPC ....................................................... 526/255
See application file for complete search history.

(56) References Cited

U.S. PATENT DOCUMENTS

| | | | |
|---|---|---|---|
| 3,376,370 A | | 4/1968 | Koblitz et al. |
| 3,922,186 A | * | 11/1975 | Segawa et al. ............... 156/310 |
| 4,200,568 A | * | 4/1980 | Trautvetter et al. ........... 525/199 |
| 4,360,652 A | * | 11/1982 | Dohany ....................... 526/210 |
| 4,569,978 A | | 2/1986 | Barber |
| 5,093,427 A | | 3/1992 | Barber |
| 5,385,956 A | | 1/1995 | Schellekens et al. |
| 5,776,637 A | | 7/1998 | Kashio et al. |
| 5,898,051 A | | 4/1999 | Kawashima et al. |
| 6,187,885 B1 | | 2/2001 | Barber |
| 6,552,127 B1 | | 4/2003 | Shimizu et al. |
| 6,586,547 B1 | * | 7/2003 | Amin-Sanayei et al. ..... 526/255 |
| 6,734,264 B1 | * | 5/2004 | Amin-Sanayei ............... 526/82 |
| 6,989,427 B2 | * | 1/2006 | Pascal ........................... 526/255 |
| 2003/0225208 A1 | * | 12/2003 | Pascal ........................... 525/88 |
| 2009/0069488 A1 | | 3/2009 | Durali et al. |

FOREIGN PATENT DOCUMENTS

JP      10255808 A      9/1998
JP      2000309672 A    11/2000

* cited by examiner

*Primary Examiner* — Nicole M Buie-Hatcher
(74) *Attorney, Agent, or Firm* — Thomas F. Roland

(57) ABSTRACT

The invention relates to a polyvinylidene fluoride polymer having an ultra-high molecular weight, and unexpected physical properties. The ultra-high molecular weight polymer is clear, has a lower melting point, reduced crystallinity, excellent impact resistance, and a high elongation at the yield point. The ultra-high molecular weight polyvinylidene fluoride can be alone, or blended with other polymers, in final applications and articles.

10 Claims, 1 Drawing Sheet

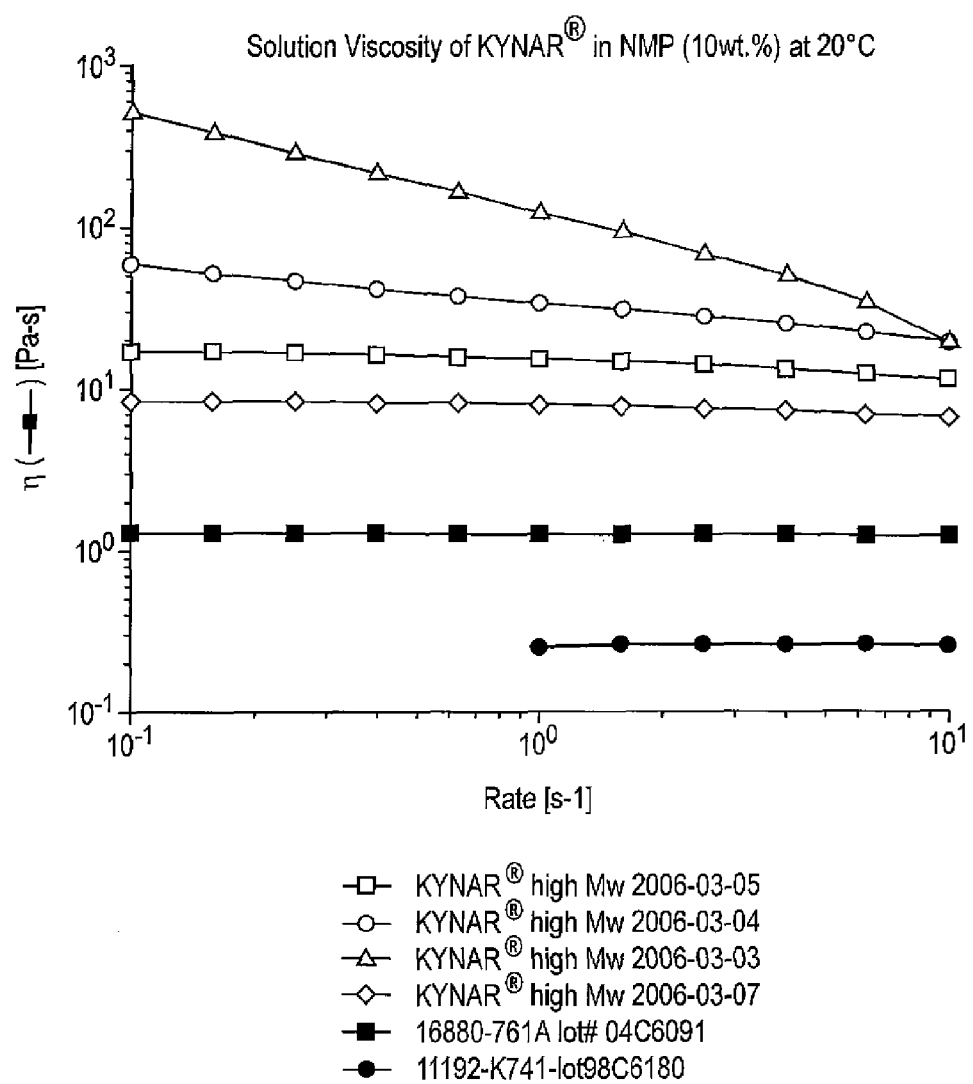

ULTRA-HIGH MOLECULAR WEIGHT POLY(VINYLIDENE FLUORIDE)

This application claims benefit, under U.S.C. §119 or §365 of US Provisional Application Number US 60/818,869, filed Jul. 6, 2006; and PCT/US2007/072085, filed Jun. 26, 2007.

FIELD OF THE INVENTION

The invention relates to a polyvinylidene fluoride polymer having an ultra-high molecular weight, and unexpected physical properties. The ultra-high molecular weight polymer is clear, has a lower melting point, reduced crystallinity, excellent impact resistance, and a high elongation at the yield point. The ultra-high molecular weight polyvinylidene fluoride can be alone, or blended with other polymers, in final applications and articles.

BACKGROUND OF THE INVENTION

Polyvinylidene fluoride (PVDF) polymers are melt-processable resins that are formed into polymer structures by many different processes, such as extrusion, injection molding, fiber spinning, extrusion blow molding and blown film. They are also used as polymer processing aids due to their low surface energies and phase behaviors. Increasing the PVDF molecular weight is known to increase the melt strength, but often decreases other properties such as the drawdown ratio. Crosslinked PVDF may increase the melt strength, but are limited by the fact that they are not easily processable and often contain a high amount of gels.

High molecular weight PVDF is made on an industrial scale by emulsion polymerization. The highest molecular weight commercial product, KYNAR® 761A (Arkema Inc.) has melt viscosity of 35 kp and a solution viscosity of 350 cp in 7.5% NMP and 25° C. The highest molecular weight PVDF made at industrial scale via suspension polymerization, KF-7200 Kureha) has solution viscosity of about 1900 cp in 7.5% NMP at 25° C.

Surprisingly it has now been found that a fluoropolymer having ultra-high molecular weight can be made and processed, and the physical properties exhibited by the ultra-high molecular weight materials are far beyond those expected merely by the large increase in molecular weight.

SUMMARY OF THE INVENTION

The invention describes an ultra-high molecular weight polyvinylidene fluoride, having a solution viscosity of greater than 35 Pa-s in 10% n-methyl pyrrolidone (NMP) at 20° C. The ultra-high molecular weight polyvinylidene fluoride has unique properties, including a very high elongation at yield point, excellent clarity, high gel strength, and excellent impact strength.

The invention also describes a process for synthesizing the ultra-high molecular weight polyvinylidene fluoride.

The invention further describes uses of the ultra-high molecular weight polyvinylidene fluoride.

BRIEF DESCRIPTION OF THE DRAWINGS

FIG. 1: Demonstrates the solution behavior and viscosity of the ultra-high molecular weight PVDF of the Invention (examples 1 and 2) relative to other commercial samples.

DETAILED DESCRIPTION OF THE INVENTION

The term "vinylidene fluoride polymer" used herein includes both normally solid, high molecular weight homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, perfluoromethyl vinyl ether, perfluoropropyl vinyl ether and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 mole percent trifluoroethylene. Terpolymers of vinylidene fluoride, hexafluoropropene and tetrafluoroethylene such as described in U.S. Pat. No. 2,968,649 and terpolymers of vinylidene fluoride, trifluoroethylene and tetrafluoroethylene are also representatives of the class of vinylidene fluoride copolymers that can be prepared by the process embodied herein.

Although the process of the invention will be generally illustrated with respect to the polymerization of vinylidene fluoride homopolymer, one of skill in the art will recognize that analogous polymerization techniques can be applied to the preparation of copolymers of vinylidene fluoride with fluorinated or unfluorinated co-reactive monomers.

The polymers are conveniently made by an emulsion polymerization process, but could also be synthesized by a suspension, solution, or supercritical $CO_2$ process. In an emulsion polymerization process, a reactor is charged with deionized water, water-soluble surfactant capable of emulsifying the reactant mass during polymerization and paraffin antifoulant.

The mixture is stirred and deoxygenated. A predetermined amount of chain transfer agent, CTA, is then introduced into the reactor, though no CTA might be used in the present process. The reactor temperature is raised to the desired level and vinylidene fluoride fed into the reactor. Once the initial charge of vinylidene fluoride is introduced and the pressure in the reactor has reached the desired level, an initiator emulsion or solution is introduced to start the polymerization. The vinylidene fluoride is continuously fed along with additional initiator to maintain the desired pressure. The temperature of the reaction can vary depending on the characteristics of the initiator used and one of skill in the art will know how to do so. Typically the reactor temperature will be from about 30° to 120° C., preferably from about 60° to 110° C. The polymerization pressure may vary, typically within the range of from 40 to 50 atmospheres. Once the desired amount of polymer conversion has been reached in the reactor, the monomer feed will be stopped, but initiator feed is optionally continued to consume residual monomer. Residual gases (containing unreacted monomers) are then vented and the latex recovered from the reactor. The polymer may then be isolated from the latex by standard methods, such as, acid coagulation, freeze thaw, spray-dry, freeze-dry, or high shear coagulation separation.

The emulsifier used could be fluorinated or non-fluorinated, as known in the art of vinylidene fluoride polymerization. Surfactants suitable for use in the polymerization are well known in the art and are typically water soluble halogenated surfactants, especially fluorinated surfactants such as the ammonium, substituted quaternary ammonium or alkali metal salts of perfluorinated or partially fluorinated alkyl carboxylates, the perfluorinated or partially fluorinated monoalkyl phosphate esters, perfluorinated or partially fluorinated alkyl ether or polyether carboxylates, the perfluorinated or partially fluorinated alkyl sulfonates, and the perfluorinated or partially fluorinated alkyl sulfates. Non-fluorinated surfactants include those described in U.S. patent application Ser. Nos. 10/832,535; 11/149,797; 60/706,463; and 60/706,464. The surfactant charge is from 0.05% to 2% by weight on the total monomer weight used, and most preferably the surfactant charge is from 0.1% to 0.2% by weight.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate, metabisulfite, or ascorbic acid. Among the organic peroxides which can be used for the polymerization are the classes of dialkyl peroxides, diacyl-peroxides, peroxyesters, and peroxydicarbonates. Exemplary of dialkyl peroxides is di-t-butyl peroxide, of peroxyesters are t-butyl peroxypivalate and t-amyl peroxypivalate, and of peroxydicarbonate, and di(n-propyl) peroxydicarbonate, diisopropyl peroxydicarbonate, di(sec-butyl) peroxydicarbonate, and di(2-ethylhexyl) peroxydicarbonate. The use of diisopropyl peroxydicarbonate for vinylidene fluoride polymerization and copolymerization with other fluorinated monomers is taught in U.S. Pat. No. 3,475,396 and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP 58065711. The quantity of an initiator required for a polymerization is related to its activity and the temperature used for the polymerization. The total amount of initiator used is generally between 100 to 2000 ppm by weight on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

The chain transfer agents, CTA, suitable for this polymerization are known in the art and are typically short hydrocarbon chains like ethane and propane, esters such as ethyl acetate or diethyl maliate, HCFC and others. When an organic peroxide is used as the initiator, it could act also as effective CTA during the course of free radical polymerization. The additional CTA however, may be added all at once at the beginning of the reaction, or it may be added in portions, or continuously throughout the course of the reaction. The amount of CTA and its mode of addition depend on the desired properties. In this invention, generally the amount of deliberately added CTA is zero or near zero; i.e. 500 ppm or less. However, total organic charges including both organic peroxide plus CTA charge is from 100 to 2000 ppm by weight on the total monomer weight used, and most preferably the total organic charge is from 150 to 1500 ppm by weight.

A paraffin antifoulant is optionally used in the polymerization. Any long-chain, saturated, hydrocarbon wax or oil may be used. Reactor loadings of the paraffin typically are from 0.01% to 0.3% by weight on the total monomer weight used.

When copolymerization of vinylidene fluoride and hexafluoropropylene are performed, or copolymerization of any two coreactive fluorinated monomers having differing reaction rates, the initial monomer charge ratio and the incremental monomer feed ratio during polymerization can be adjusted according to apparent reactivity ratios to avoid compositional drift in the final copolymer product.

Commercial PVDF is a linear polymer having low elasticity, low melt strength, and poor impact resistance. It does not exhibit a high elongation at yield, making production of highly oriented super tough fibers or films would not be possible. The solution viscosity of ordinary PVDF does not have sufficient gel strength to be used in fast gel extrusion processes such as casting of film, production of fibers, or hollow fibers. Moreover, regular PVDF has shortcomings when PVDF is used as binder in Li-ion battery, since the addition to electrodes and loading of PVDF are critical factors in the battery performance The ultra-high molecular weight polyvinylidene fluoride of the invention exhibits a combination of interesting and unexpected properties that are very different from those of commercial PVDF. Some of these properties include: lower melting temperature, reduced crystallinity, superb impact resistance, and not anticipated an improved clarity. Even more surprisingly, the polymer exhibits a very high elongation at yield point.

The solution viscosity of the ultra-high PVDF of the invention is over 35 Pa-s in 10% NMP at 20° C.; preferably 45 Pa-s, and more preferably over 50 Pa-s. While not being bound by any particular theory, the dissolved polymer chains in a solution with such a high solution viscosity would be expected to reach the percolation limit, and as a result would show an abrupt change in the solution properties. The solution could become non-Newtonian and exhibit shear thinning behavior and could also exhibit high gel strength even at low polymer concentrations. Regular PVDF solutions do not show these types of behaviors at low polymer loadings.

The ultra-high molecular weight PVDF exhibits a high clarity compare to ordinary PVDF. Articles made from this PVDF could be useful in applications where such high clarity is desired.

The PVDF of the invention shows a very high elongation at the yield point. This property enables the novel polymer to be used in many applications such as in the production of highly orientated fibers, and in high impact resistance articles.

Furthermore, the use of this novel polymer could be advantageous in many applications such as: polymer processing additives for polyolefin; fabrication of liquid Li-ion batteries as a binder for electrode and/or as separator; making PME for solid Li-ion battery; gel extrusion of fibers, gel extrusion or casting of membranes and films and hollow fibers. It can also be used as an additive in the processing of poly olefins.

The ultra-high molecular weight PVDF of the invention can also be blended with ordinary PVDF, and other compatible polymers such as polymethyl methacrylate and its copolymers, to improve its melt strength and other properties.

One in the art can think of many other uses for a PVDF having such uniques properties, based on the disclosure herein and the listed uses of these materials.

The following examples further illustrate the best mode contemplated by the inventors for the practice of their invention and should be considered as illustrative and not in limitation thereof.

EXAMPLES

Example 1, 2

Into an 80-gallon stainless steel reactor was charged, 345 lbs of deionized water, 225 grams ammonium perfluorodecanoate, 6 grams of paraffin wax, and desired amount of ethyl acetate (chain transfer agent, CTA. Following evacuation, agitation was begun at 23 rpm and the reactor was heated. After reactor temperature reached the desired set point of 90° C., VDF charge starts. Reactor pressure was then raised to 650 psi by charging 40 lbs VDF into the reactor. After reactor pressure was stabilized, 3.5 lbs of an NPP (di-N-propyl peroxydicarbonate) emulsion was added to the reactor to initiate polymerization. The initiator emulsion was 1.0 wt. % NPP in deionized water containing 0.2 wt. % ammonium perfluorodecanoate. The rate of further addition of the NPP emulsion was adjusted to obtain and maintain a VDF polymerization rate of roughly 70 pounds per hour. The VDF homopolymerization was continued until approximately 190 pounds VDF was introduced in the reaction mass. The VDF feed was stopped and the batch was allowed to react-out at the reaction temperature and by feeding initiator to consume residual monomer at decreasing pressurer. After 20 minutes, the agitation was stopped and the reactor was vented and the latex recovered. Polymer resin was isolated by coagulating the latex, washing the latex with deionized water, and drying. The resin so produced have the following properties.

The comparative examples listed are for commercial products from Arkema Inc.: KYNAR 761A, KYNAR FLEX 7300, and KYNAR FLEX 7200.

| Examples | CTA (g) | Melt Viscosity (kp) @ 230° C. & 100 s$^{-1}$ | Solution viscosity (Pa-s) 10% in NMP @ 20° C. & 0.1 s$^{-1}$ |
|---|---|---|---|
| 1 | 0 | 56 | 600 |
| 2 | 30 | 52 | 60 |

| Counter Examples | Melt Viscosity (kp) @ 230° C. and 100 s$^{-1}$ | Solution viscosity (Pa-s) 10% in NMP @ 20° C. and 0.1 s$^{-1}$ |
|---|---|---|
| KYNAR 761A | 32 | 1.2 |
| KYNAR FLEX-7300 | ? | 25 |
| KYNAR FLEX-7200 | ? | 8.2 |

What is claimed is:

1. A process for forming an ultra-high molecular weight polyvinylidene fluoride, comprising the step of adding in the initial charge organic peroxide and/or chain transfer agent to a polymerization reactor, wherein the total level of chain transfer agent added is 500 ppm or less, and the total organic charges including both organic peroxide plus chain transfer agent added is from 100 to 2000 ppm based on the total weight of monomer, wherein said process is a semi-batch emulsion process, and wherein said ultra-high molecular weight polymer formed has a solution viscosity of greater than 35 Pa-s at 10% PVDF in n-methyl pyrrolidone (NMP) at 20° C. and 0.1 s$^{-1}$.

2. The process for forming the ultra-high molecular weight polyvinylidene fluoride of claim 1, having a solution viscosity of greater than 45 Pa-s at 10% PVDF in n-methyl-pyrrolidone (NMP) at 20° C. and 0.1 s$^{-1}$.

3. The process for forming the ultra-high molecular weight polyvinylidene fluoride of claim 2, having a solution viscosity of greater than 50 Pa-s at 10% PVDF in n-methyl pyrrolidone (NMP) at 20° C. and 0.1 s$^{-1}$.

4. The process for forming the ultra-high molecular weight polyvinylidene fluoride of claim 1, wherein said polyvinylidene fluoride is a homopolymer.

5. The process for forming the ultra-high molecular weight polyvinylidene fluoride of claim 1, wherein said polyvinylidene fluoride is a copolymer.

6. The process for forming the ultra-high molecular weight polyvinylidene fluoride of claim 5, wherein said polyvinylidene fluoride is a copolymer of vinylidene fluoride and hexafluoropropene.

7. The process for forming the ultra-high molecular weight polyvinylidene fluoride of claim 1, wherein said polyvinylidene fluoride is in the form of a powder or pellets.

8. The process for forming the ultra-high molecular weight polyvinylidene fluoride of claim 1, wherein said ultra-high molecular weight polyvinylidene fluoride has a very high elongation at yield point, excellent clarity, high gel strength, and excellent impact strength.

9. The process for forming the ultra-high molecular weight polyvinylidene fluoride of claim 1, wherein the ultra-high molecular weight polyvinylidene fluoride is blended with a polyvinylidene fluoride other than an ultra-high molecular weight polyvinylidene fluoride having a solution viscosity of greater than 35 Pa-s at 10% PVDF in n-methyl pyrrolidone (NMP) at 20° C. and 0.1 s$^{-1}$.

10. The process for forming the ultra-high molecular weight polyvinylidene fluoride of claim 1, wherein the polyvinylidene fluoride comprises a copolymer containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, pertfluoromethyl vinyl ether, and perfluoropropyl vinyl ether.

* * * * *